Aug. 17, 1965  W. W. MOWER ETAL  3,200,589
TWO STAGE BAFFLED INJECTOR

Filed Nov. 3, 1961  3 Sheets-Sheet 1

INVENTORS
DWIGHT I. BAKER
WILLIAM W. MOWER
BY

AGENT

INVENTORS
DWIGHT I. BAKER
WILLIAM W. MOWER
BY
Lowell T. Turner
AGENT

Aug. 17, 1965 W. W. MOWER ETAL 3,200,589
TWO STAGE BAFFLED INJECTOR
Filed Nov. 3, 1961 3 Sheets-Sheet 3

INVENTORS
DWIGHT I. BAKER
WILLIAM W. MOWER
BY
AGENT

3,200,589
TWO STAGE BAFFLED INJECTOR
William W. Mower, Calabasas, and Dwight I. Baker, Woodland Hills, Calif., assignors to North American Aviation, Inc.
Filed Nov. 3, 1961, Ser. No. 150,085
6 Claims. (Cl. 60—39.46)

This invention relates to an injector and more particularly to an injector for supplying propellant to the combustion chamber of a combustion device.

The injector of this invention, while finding primary application in rocket engines and being described herein as so applied, is also capable of utilization in various other combustion devices, e.g., jet engines and gas generators.

Rocket engine propellant injectors of the prior art are normally constructed from a flat or curved plate having a plurality of propellant injection orifices accurately drilled in the plate such that mutual impingement of propellant streams is facilitated. This impingement causes the propellants to be intimately mixed and partially atomized, enhancing their ability to support combustion. The injector is normally oriented in the combustion chamber opposite the throat. One of the primary deficiencies encountered in such injectors is their inability to sufficiently control combustion instability during combustion phases. It has been found that the instability results, at least in part, from pressure oscillations corresponding in frequency and phase relation to the tangential and radial acoustic resonances of the combustion chamber. In this phenomena combustion modes, i.e., modes substantially parallel to the injector face, race back and forth across the face, triggering instability characteristics of ever increasing amplitude.

Another detriment of prior art injectors has been their inability to achieve superior combustion efficiency by the local control of propellant mixture ratio through the use of staged injection without the use of a separate secondary injector downstream from the primary injector.

It is a primary objective of this invention to provide an injector structure whereby combustion instability is substantially reduced or eliminated.

Another object of the invention is to dampen tendencies toward combustion instability initiated in a combustion chamber.

Yet another object is to provide two-stage injection of propellant in a baffled injector for increasing combustion efficiency.

A further object is to provide cooled baffles extending from the injector into the combustion chamber.

A still further object is to provide injector means whereby a superior propellant atomization is facilitated.

Other objects of invention will become apparent from the following description taken in connection with the accompanying drawings in which.

Broadly stated, the injector of this invention includes a face portion including a plurality of propellant injection orifices therein for accepting and injecting liquid propellant into a combustion chamber. A plurality of baffle elements extend from the face portion and divide the region adjacent the face into a series of compartments. The baffle elements include orifice means therethrough whereby propellant is transmitted through such passages for cooling the baffles and providing a secondary injection of the propellants in a position downstream from the face portion.

Figure 1:
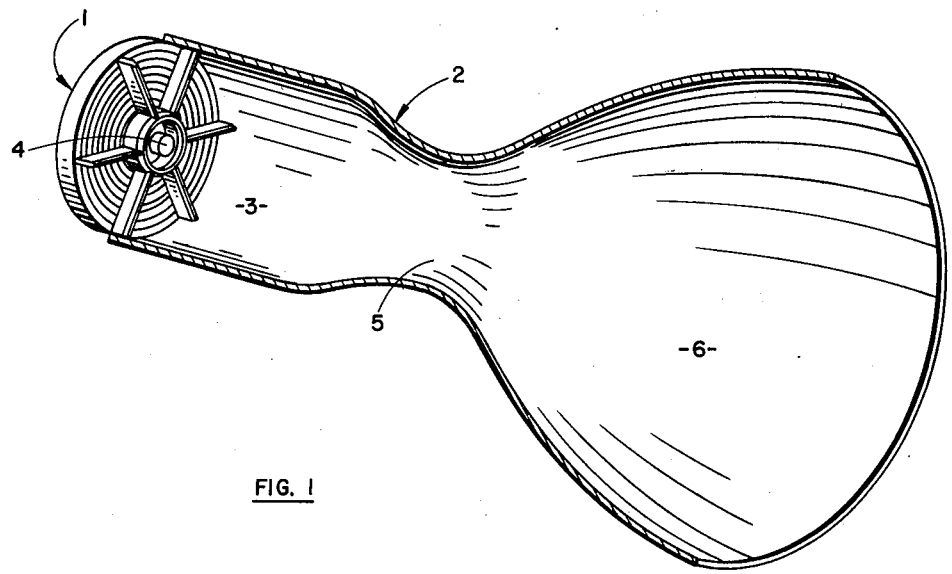
FIG. 1 is a simplified cutaway perspective of a rocket engine thrust chamber including the injector of the present invention.

FIG. 1 illustrates an injector 1 of this invention disposed in its typical environment as a portion of rocket engine thrust chamber 2 at one end of combustion chamber 3. Propellants, for example, liquid oxygen and kerosene, are injected into combustion chamber 3 from injector 1 and are typically ignited by a squib operated pyrotechnic igniter 4, of conventional configuration.

The propellants are combusted in chamber 3, producing gases which expand as they pass through throat 5 and nozzle 6. They are exhausted from nozzle 6.

In order that the final thrust may be most effectively produced, it must be assured that the inception of the procedure whereby such thrust is eventually achieved is effectively and efficiently accomplished. Therefore, it is apparent that the injection of propellant into the combustion chamber and particularly the initial combustion phase thereof is critical in the achievement of maximum and predictable thrust generation. Such injection is additionally important to the elimination of possible hardware injury or destruction throughout the balance of the combustion process.

Figure 2:
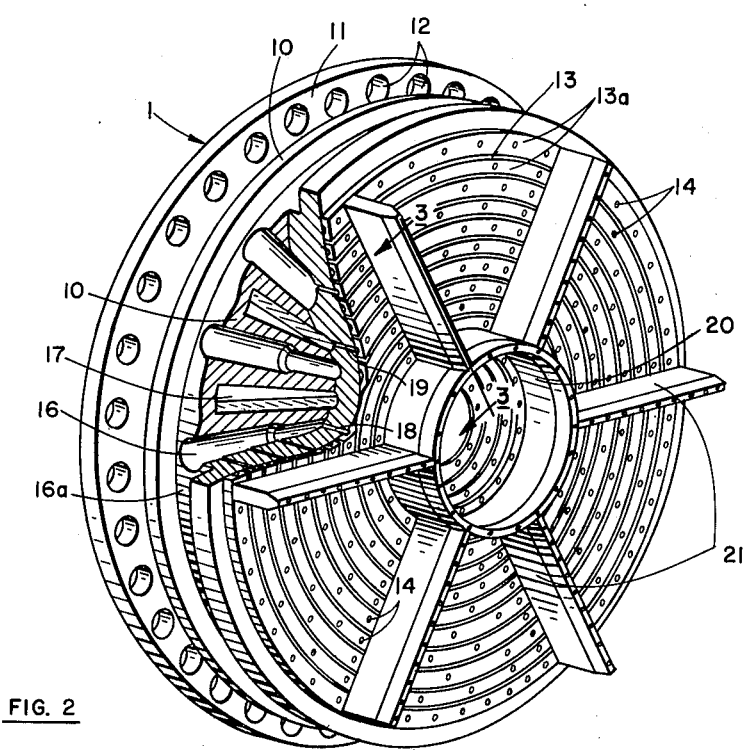
FIG. 2 is an enlarged perspective view of the injector of this invention partially cutaway to show passage.
Figure 3:
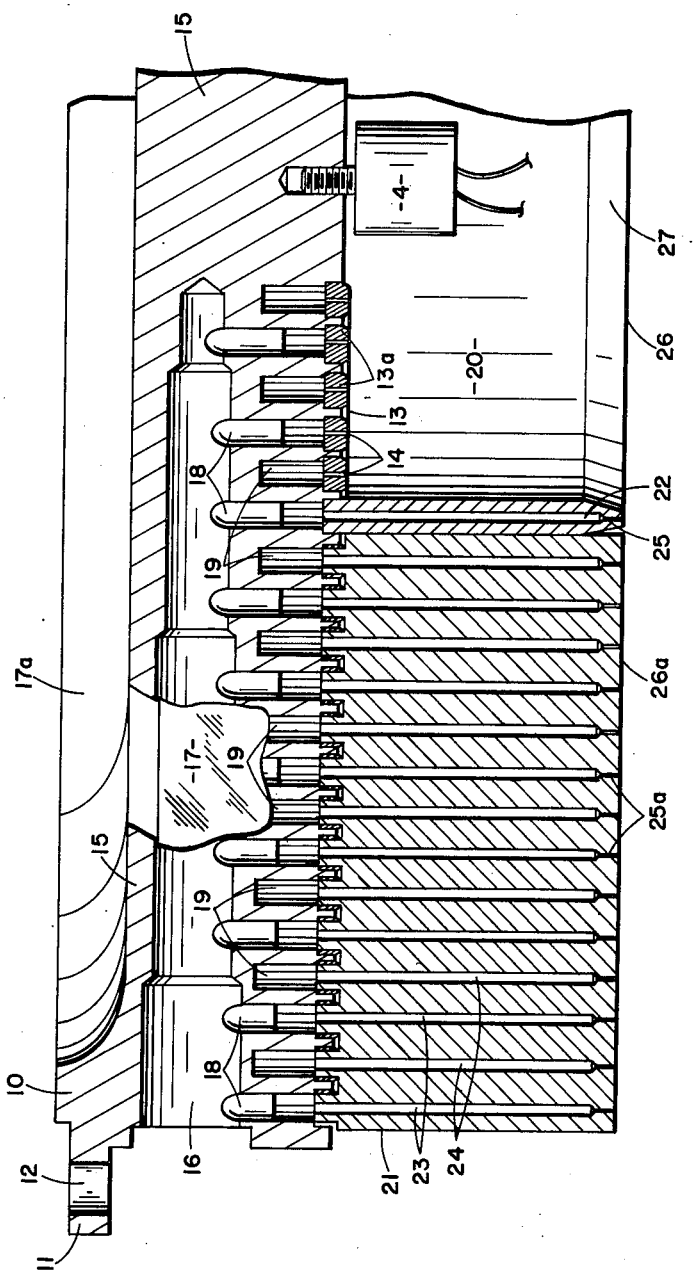
FIG. 3 is a cross sectional view taken along line 3—3 of FIG. 2 and partially cutaway.

An enlarged perspective of the injector of FIG. 1 in a preferred embodiment is illustrated in FIG. 2. Injector 1 includes a body 10 having a peripheral flange 11 at one end thereof. Bolt holes 12 are provided in the flange for peripheral attachment to thrust chamber 2. A face plate 13 is either fabricated from a solid plate or made up of a series of concentric rings 13a, as illustrated. Rings 13a include propellant injection orifices 14 which are drilled at relative angles for propellant impingement in accordance with standard techniques. Concentric rings 13a are welded, brazed or otherwise retained as a portion of face plate 13 in a fluid-tight relationship and as an integrated structure. Rings 13a are preferably fabricated from a metal having high heat conductivity characteristics, e.g., copper, in order that heat will be transferred rapidly from specific locations. This eliminates the tendency for local hot spots to develop on the injector face, causing local burnout. The thermal diffusivity of the preferred metal spreads the heat so rapidly into adjacent regions that the heat has no opportunity to create such potential burnout areas. Injector body 10 includes a series of substantially radial passages 16 leading from a propellant manifolding region 16a at the injector periphery. As seen more clearly in FIG. 3, another series of radial passages or doghouses 17 are interconnected with a second propellant manifold or distribution region 17a at an injector body region opposite of face 13. Passages 16 and 17 serve to transfer fuel and oxidizer to injector orifices 14 through distribution grooves 18 and 19, respectively, in body 15. Grooves 18 and 19 are covered by rings 13a. This makes up the first or primary injector portion of the invention.

Extending from face plate 13 is a series of baffles, preferably including a circular central baffle member 20 and a series of baffle members 21 radiating therefrom. Radial baffles 21 extend approximately to the outer periphery of face plate 13.

The baffles are either manufactured integral with body 10 or manufactured separately and integrally attached by welding, brazing etc. In any event, they are preferably attached directly to the injector face and made from a high heat transfer metal for the same reason as are injector rings 13a. As most specifically illustrated in the sectional view of FIG. 3, circular baffle 20 includes a series of propellant transfer passages 22. These passages may be connected alternately to fuel and oxidizer grooves 18 and 19; or in the more usual case, to the grooves of one propellant only, over which groove the baffle is disposed. Radial baffles 21 include propellant passages 23 and 24 connected to distribution grooves 18 and 19, respectively. At the baffle extremities remote from face plate 12 injector orifices 25 and 25a interconnect baffle passages 22, 23 and 24 with baffle tips 26 and 26a. Orifices 25 and 25a are drilled as straight passages, cut as transverse slots between the baffle sides, drilled as standard shower head orifices, or otherwise shaped to suit specific requirements. Baffle tips 26 and 26a are usually tapered in the manner illustrated at 27 to prevent corner burning and enhance gas flow characteristics. These baffles, passages and orifices comprise the secondary injector portion of the invention.

Ignition is provided by an igniter of which igniter 4 is an example, igniter 4 being of conventional pyrotechnic construction. Best results are achieved in ignition when an individual igniter is provided in each baffle compartment, the danger of explosion being present when this procedure is not followed. Hypergolic ignition has been found to be most particularly adaptable in the practice of the present invention. In such conventional approach, a hypergolic chemical compound, e.g., triethyl aluminum, is injected into each compartment of the injector, usually in conjunction with an oxidizer lead. When the hypergol contacts the oxidizer, the immediate result is combustion. The full propellant injection then takes place and combustion is sustained.

Functionally, a first pressurized propellant (usually fuel) is introduced into passages 16. It is then transferred into distribution grooves 18. A portion of this propellant is injected into combustion chamber 3 through orifices 14 in rings 13a. The balance of this first propellant is transferred into passages 22 and 23 and injected into combustion chamber 3 from orifices 25 and 25a. Substantially simultaneously, a second pressurized propellant (usually oxidizer) is introduced into doghouses 17 and is transferred to distribution grooves 19. From these positions a portion of this propellant is injected directly into combustion chamber 3 through orifices 14 in rings 13a alternate to those from which the first propellant emanated. Fuel and oxidizer streams (the first and second propellants) are injected into impingement against one another in some instances through controlled orifice drilling. This impingement causes propellant atomization, thereby enhancing the capability of the mixed propellants to support combustion.

Actuation of igniter 4 is initiated substantially simultaneous with the injection of the propellants into the combustion chamber, preferably in each baffled compartment. The propellants are thereby ignited and combusted in the combustion chamber. The combustion and expansion phases of engine operation then proceed essentially as set forth above.

In the initial phases of combustion, since gases evolved from the combustion process tend to expand rapidly in all directions, combustion modes traveling in both axial and transverse directions are established, resulting in acoustic resonances or buzzing characteristics. As various of the modes progress in the transverse or partially transverse direction, they are intercepted and redirected or dampened by baffles 20 and 21. Any redirection of combustion gases results in an essentially axially directed gas stream. This prevents reinforcement and gradual buildup of the transverse combustion modes leading to or supporting combustion instability. The result is the achievement of a smooth primary injection and combustion sequence which is non-destructive in its effect upon supporting structure. It also leads to a more efficient and easily controlled overall combustion.

Added to this improved primary phase is the benefit of the secondary injection and combustion phase. It has long been recognized that a multiple stage propellant injection results in a more efficient combustion process than does a single stage injection. Multiple stage injection provides the ability to control mixture ratio locally. The propellants may also be injected in specific secondary locations wherein high velocity gases from first stage injection cause drop shattering of the propellants and wherein propellants properly introduced will result in a maximum of propellant atomization. The baffled injector of this invention also provides benefits in this regard, the second stage injection being accomplished from baffle orifices 25 and 25a. Hence, the baffles serve a dual fuction in not only preventing combustion instability as described above, but in also providing means whereby secondary propellant injection is accomplished.

The baffles are made of sufficient length, i.e., the distance of the extension from the injector face, to insure substantially complete primary combustion prior to introduction of secondary propellants. When the gases produced in primary combustion reach the secondary injection position, they are traveling at high velocity in an essentially axial direction. Secondary propellants are injected from orifices 25 and 25a directly into this high velocity gas stream. The result is a substantially instantaneous shattering and entrainment of the secondarily injected propellant droplets by the high velocity gases. This propellant is ignited by the primary combustion products, the secondary combustion taking place as the atomized and entrained propellants proceed axially in the high velocity stream of the primary combustion products. Transverse combustion modes which tend to trigger combustion instability have no opportunity to progress in this environment.

As the propellants and combustion products move downstream, combustion progresses in combustion chamber 3, the combustion being substantially completed therein before the nozzle is reached. This staging of propellant injection provides a substantially non-detonable combustion sequence which tends to inhibit detonative flash-backs thereby further enhancing combustion stability.

Figure 4:
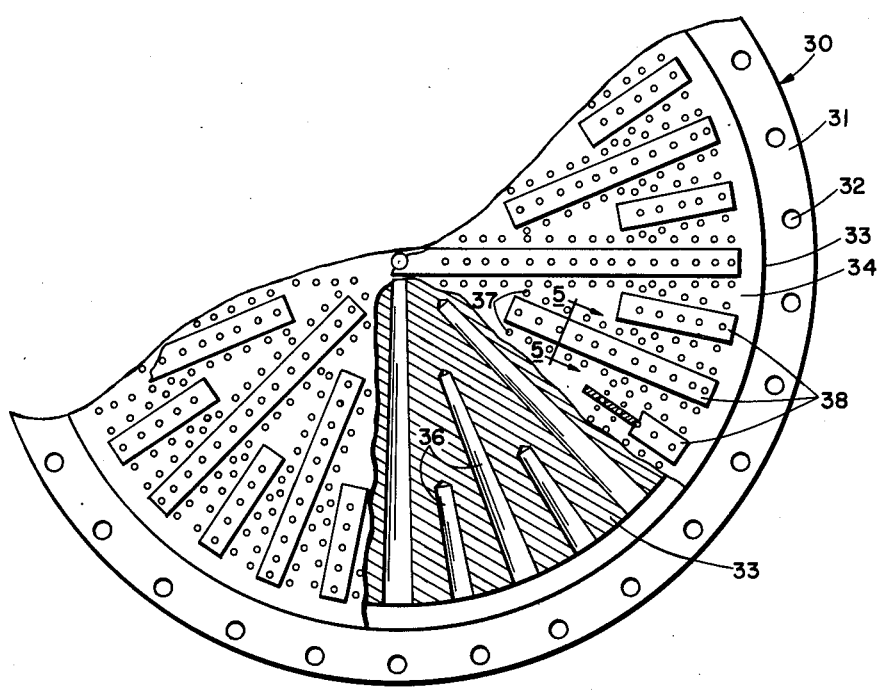
FIG. 4 is a plan view in partial cutaway of an alternate embodiment of the invention.
Figure 5:
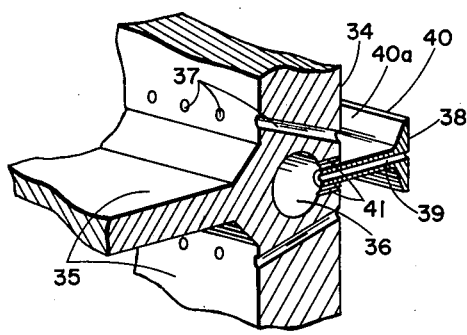
FIG. 5 is a partial section taken essentially along line 5—5 of FIG. 4 and shown in perspective.

The injector configuration of FIGS. 4 and 5 is an alternative embodiment wherein only essentially radial baffles are provided and wherein splash plates are incorporated on the baffled extremities. The FIG. 4 injector is generally indicated as 30. It includes a flange 31 with attachment holes 32 therethrough. The flange is attached to the injector body 33 which includes a face portion 34. A series of doghouses 35 (FIG. 5) in the rearward side of the injector face are radially oriented for acceptance and transfer of one of the propellants, usually the oxidizer. A plurality of radial passages 36 are provided in the injector body intermediate of doghouse 35 for transfer of a second propellant (usually fuel) for both primary and secondary injection. Orifices 37 are drilled through the injector body 33 so as to interconnect doghouses 35 with face portion 34, usually such that adjacent propellant streams emanating therefrom are impinged against one another. As discussed further below these streams are sometimes also impinged against portions of a series of radially oriented and axially extending baffles 38 which are attached to injector body 33. Baffles 38 are substantially coextensive with and disposed over propellant passages 36. Each baffle 38 incorporates a plurality of propellant injection orifices 39 therethrough so as to interconnect propellant passage 36 with the baffle extremity.

All or selected ones of baffles 38 include splash plates 40 extending substantially normally therefrom. At least a portion of orifices 37 are so directed that propellant exiting from them is directed against side 40a of splash plates 40. Orifices 41 leading from passages 36 to face 34 also direct propellant into impingement with sides 40a of splash plates 40.

Operationally, injector 30 functions in essentially the same manner as does injector 1 described above, orifices 39 acting as the secondary injector in this instance. However, injector 30 has the advantage of more complete propellant shattering in the primary combustion phase resultant from its being initially projected against splash plates 40.

Although splash plates attached to injectors have been heretofore utilized, they have not been applied to the present combination wherein regenerative cooling and secondary injection procedures are incorporated in the dual injection function. The regenerative cooling of this novel structural configuration prevents the splash plates from burning during combustion phases, a major detriment in previous splash plate applications.

Although the invention has been described and illustrated in detail, it is to be clearly understood that the same is by way of illustration and example only and is not to be taken by way of limitation, the spirit and scope of this invention being limited only by the terms of the appended claims.

We claim:
1. A combustion device injector comprising
  (1) a body portion including
    (a) a face on one side thereof adapted to be exposed to a combustion chamber,
    (b) passage means in said body for accepting liquid propellant,
    (c) orifice means leading from said passage means to said face, and
  (2) a plurality of baffle elements attached to and extending from and across at least a portion of said face dividing said face into a series of compartments to prevent combustion instability transverse to said face,
    (a) said baffle elements including orifice means therein interconnected with said passage means and exiting from extremities of said baffle elements.
2. A propellant injector comprising
  (1) a body portion including
    (a) means therein for accepting and transferring propellant,
    (b) a planar face portion thereon adapted for facing a region wherein combustion is to be supported,
    (c) means defining a plurality of orifices connecting said propellant transfer means and said face portion so as to direct propellant in an impinging relation with propellant injected from adjacent orifices, and
  (2) a plurality of baffles attached to and extending from and across at least a portion of said face and adapted to suppress transverse combustion modes adjacent said face portion,
    (a) said baffles including passage means and orifice means therein interconnected with said propellant transfer means for causing a second stage propellant injection at a position removed from said injector face.
3. A propellant injector comprising
  (1) a body portion including
    (a) fuel passage means,
    (b) oxidizer passage means,
    (c) a face portion, and
    (d) orifice means interconnecting said fuel passage means and said face portion and said oxidizer passage means and said face portion,
  (2) a plurality of baffles fixed to said face portion and extending therefrom, said baffles including
    (a) passage means substantially through said baffles and portions of said body, said last mentioned passage means leading from said fuel and oxidizer passage means, and
    (b) orifice means in said baffles interconnecting said last mentioned passage means and extremities of said baffles.
4. The propellant injector of claim 3 wherein said body includes a plurality of concentric rings, said rings containing said first mentioned orifices and comprising a part of said face portion.
5. The propellant injector of claim 3 wherein portions of said injector including said face portion and said baffles are made from a material of high heat conductivity.
6. A two stage propellant injector comprising
  (1) a body portion including a
    (a) face portion facing a zone wherein combustion is to be accomplished,
    (b) propellant passage means substantially radially oriented, and
    (c) orifice means leading from said passage means to said face portion,
  (2) baffles
    (a) attached to said face portion
    (b) in a substantially radial pattern,
    (c) extending therefrom, and
    (d) including orifices therethrough adapted for accepting propellant from said passage means and delivering it to a region adjacent extremities of said baffles, and
  (3) a splash plate
    (a) extending from selected ones of said baffles in substantial parallelism with said face portion, and
    (b) oriented to accept propellant streams from selected ones of said body portion orifies in impinging relations.

References Cited by the Examiner
UNITED STATES PATENTS

| | | | |
|---|---|---|---|
| 1,605,839 | 11/26 | Herman | 239—559 X |
| 2,616,257 | 11/52 | Mock | 60—39.74 |
| 2,674,848 | 4/54 | Goddard | 60—39.46 |
| 2,701,444 | 2/55 | Day | 60—39.74 |
| 2,929,208 | 3/60 | Schultz | 60—39.74 |
| 2,935,845 | 5/60 | Neuhoefer | 60—39.74 |

SAMUEL LEVINE, *Primary Examiner.*

SAMUEL FEINBERG, *Examiner.*